(12) United States Patent
Mosteiro Goyoaga

(10) Patent No.: US 9,636,961 B2
(45) Date of Patent: May 2, 2017

(54) METHOD FOR OBTAINING AN ARM FOR MULTI-LINK SUSPENSIONS OF AUTOMOTIVE VEHICLES AND A SUSPENSION ARM

(71) Applicant: EDAI TECHNICAL UNIT, A.I.E., Amorebieta (ES)

(72) Inventor: Jose Ramón Mosteiro Goyoaga, Amorebieta (ES)

(73) Assignee: EDAI TECHNICAL UNIT, A.I.E., Amorebieta (ES)

( * ) Notice: Subject to any disclaimer, the term of this patent is extended or adjusted under 35 U.S.C. 154(b) by 0 days.

(21) Appl. No.: 14/851,514

(22) Filed: Sep. 11, 2015

(65) Prior Publication Data

US 2016/0075201 A1    Mar. 17, 2016

(30) Foreign Application Priority Data

Sep. 12, 2014  (EP) .................................... 14382346

(51) Int. Cl.
*B60G 7/00*     (2006.01)
*B60G 3/04*     (2006.01)
(Continued)

(52) U.S. Cl.
CPC .............. *B60G 7/001* (2013.01); *B23P 13/04* (2013.01); *B23P 15/00* (2013.01); *B60G 3/04* (2013.01);
(Continued)

(58) Field of Classification Search
CPC ................ B60G 7/001; B60G 2206/11; B60G 2206/8103; B60G 2206/8105;
(Continued)

(56) References Cited

U.S. PATENT DOCUMENTS 1,380,659 A  *  6/1921  Layman .................... F16C 7/02
                                                              74/559
5,885,688 A  *  3/1999  McLaughlin ........... B29C 70/70
                                                              267/273
(Continued)

FOREIGN PATENT DOCUMENTS

EP          1977849 A1     10/2008
JP          0299004 U       8/1990
(Continued)

OTHER PUBLICATIONS

Corresponding EP Application No. EP 2995481A1 with European Search Report.
(Continued)

*Primary Examiner* — Laura Freedman
(74) *Attorney, Agent, or Firm* — Michael B. Fein; Eckert Seamans Cherin & Mellott, LLC

(57) ABSTRACT

A suspension arm for multi-link suspensions of automotive vehicles, comprising a body formed by a hollow extruded profile the cross-section of which has a closed outer contour formed by side walls and comprising at least one inner partition internally splitting the profile into at least two inner cavities, the extruded profile having the length of the arm to be obtained, according to a longitudinal axis of the arm, where a central section of the arm is machined in at least one side wall having no inner partition extending therefrom without the machining ever reaching an inner partition, and where the side walls having the at least one inner partition extending therefrom comprise an end opening in each end area of the arm, between which the central section is arranged, and a method for making the suspension arm.

20 Claims, 2 Drawing Sheets

(51) Int. Cl.
*B23P 13/04* (2006.01)
*B23P 15/00* (2006.01)

(52) U.S. Cl.
CPC ....... *B23P 2700/14* (2013.01); *B60G 2206/11* (2013.01); *B60G 2206/811* (2013.01); *B60G 2206/8103* (2013.01); *B60G 2206/8105* (2013.01); *B60G 2206/8111* (2013.01); *B60G 2206/82* (2013.01)

(58) Field of Classification Search
CPC ...... B60G 2206/811; B60G 2206/8111; B60G 3/04; B60G 3/18; B23P 2700/14; B23P 13/04; B23P 15/00; B21D 53/88
See application file for complete search history.

(56) References Cited

U.S. PATENT DOCUMENTS

| | | | | |
|---|---|---|---|---|
| 6,241,267 | B1 * | 6/2001 | Dziadosz | B60G 3/28 280/124.134 |
| 7,506,444 | B2 * | 3/2009 | Weise | B60G 7/001 29/557 |
| 7,832,102 | B2 * | 11/2010 | Ide | B23K 20/122 228/2.1 |
| 7,850,182 | B2 | 12/2010 | Jang et al. | |
| 8,414,002 | B2 * | 4/2013 | Yu | B60G 7/001 280/124.134 |
| 8,414,003 | B2 * | 4/2013 | Yu | B60G 7/001 280/124.134 |
| 8,616,570 | B2 | 12/2013 | Mielke et al. | |
| 8,657,314 | B2 * | 2/2014 | Mosteiro Goyoaga | F16C 7/02 280/124.107 |
| 8,814,187 | B2 * | 8/2014 | Pedersen | B60G 7/001 280/124.134 |
| 9,233,587 | B2 * | 1/2016 | Korte | B21D 53/90 |
| 2002/0005621 | A1 * | 1/2002 | Christophliemke | B60G 7/001 280/124.134 |
| 2013/0205591 | A1 * | 8/2013 | Santini | B29D 24/002 29/897.2 |
| 2016/0229247 | A1 * | 8/2016 | Kuroda | B60G 7/001 |

FOREIGN PATENT DOCUMENTS

| | | |
|---|---|---|
| JP | H02-99004 U | 8/1990 |
| JP | 10264626 A * | 10/1998 |
| JP | 11218172 A * | 8/1999 |
| JP | 2005113952 A * | 4/2005 |
| WO | 00-04296 A1 | 1/2000 |
| WO | 0004296 A1 | 1/2000 |
| WO | 2013-153308 A1 | 10/2013 |
| WO | 2013155308 A1 | 10/2013 |

OTHER PUBLICATIONS

The extended Search Report issued by European Patent Office on Feb. 13, 2015.

* cited by examiner

METHOD FOR OBTAINING AN ARM FOR MULTI-LINK SUSPENSIONS OF AUTOMOTIVE VEHICLES AND A SUSPENSION ARM

CROSS-REFERENCE TO RELATED APPLICATIONS

This application claims priority from European patent application No. 14382346.6 filed Sep. 12, 2014, which is hereby incorporated by reference.

TECHNICAL FIELD OF THE INVENTION

The present invention has application in the field of the automotive component industry, specifically in multi-link suspensions.

BACKGROUND OF THE INVENTION

In a multi-link suspension, wheels are joined to a central subframe of a vehicle by means of a plurality of arms linking or joining the wheel stub axle with said subframe. Such suspensions are the object of recent technological developments made in the automotive industry. The main reason for using this suspension lies in the great rigidity it provides to the vehicle laterally, successfully preventing the well-known oversteer phenomenon. It also provides greater directional stability in the direction of travel and allows absorbing a high percentage of vibrations and noise. Multi-link suspensions therefore provide the vehicle with greater maneuverability, safety and superior comfort while travelling.

Within such suspensions, the suspension arm is a kinematic element the function of which is to statically and dynamically define the relative position of the wheel with respect to the frame of the vehicle while at the same time transmitting part of the forces of the wheel to the bodywork, and vice versa.

Today, there is large variety of suspension arms which are obtained by means of different processes, among which stamping sheet metal, forging or smelting pieces of aluminum or steel and welding bushings to tubes must be pointed out. All the cases require achieving sufficient rigidity regardless of the operating temperature.

In this sense, U.S. Pat. No. 8,616,570-B2 describes a suspension arm the cross-section of which is open and has the shape of the number Pi ($\pi$). Given its open section, this suspension arm is vulnerable to tensile, compressive and torsional stresses, as well as in its fatigue behavior. However, this suspension arm requires a specific final geometry or shape given that in addition to acting as a joint between the stub axle and subframe, it also has the function of acting as a link with other tertiary elements such as the case of the damper, which causes it to have this complex final shape, involving a large number of processes for manufacture, and therefore having a high cost.

Likewise, U.S. Pat. No. 7,850,182-B2 describes a suspension arm the cross-section of which is formed by a main cavity in the center flanked by other two side cavities located on the left and on the right. For this arm to have a shape that allows avoiding other elements of the bodywork, a variable curvature extruding process is necessary. The arm comprises an upper plate or base with cantilevered portions the purpose of which is to support tertiary elements such as the damper, like in the patent mentioned in the preceding paragraph.

DESCRIPTION OF THE INVENTION

A first aspect of the present invention relates to a method for obtaining an arm for multi-link suspensions of automotive vehicles, which allows reducing the weight of the arm, the costs and the number of processes required for manufacturing the body of the arm, which is responsible for physically joining the connecting elements, either ball and socket or elastic articulations, housed at the ends of the arm.

The method proposed by the invention comprises the following sequential steps:

a) extruding a hollow profile the cross-section of which has a closed outer contour formed by side walls and comprising at least one inner partition internally splitting the profile into at least two inner cavities, b) transversely cutting the extruded profile into sections corresponding with the length of the arm to be obtained, according to a longitudinal axis of the arm, c) in a central section of the arm, machining at least one side wall having no inner partition extending therefrom without the machining ever reaching said at least one inner partition, and d) in the side walls having said at least one inner partition extending therefrom, making at least one end opening in each end area of the arm, between which the central section is arranged.

With respect to U.S. Pat. No. 8,616,570-B2, the vulnerability to stresses is successfully overcome as a result of the inner partitions or ribs between the inner cavities of the arm of the invention. This is due to the fact that the elastic or ball and socket articulations which are housed at the ends thereof are supported in an optimal manner. The arm of the United States patent only serves to control the drop of the wheels and it is designed for that purpose. Furthermore, it serves as a link for tertiary elements as mentioned above. However, due to its modularity, it is possible to use the suspension arm of the invention to control the drop, the convergence or the forward movement of the wheels.

On the other hand, with respect to U.S. Pat. No. 7,850,182-B2, the ribs between inner cavities are not perpendicular to the axes of the articulations of the ends, which results in greater arm resistance. The arm of the invention can have one or more inner cavities, however, the arrangement of the cavities will always be such that they are located above or below one another. Therefore, the inner ribs are parallel to the axes of the articulations of the ends. To provide the arm of the United States patent with a shape that allows avoiding possible elements of the bodywork, a variable curvature extruding process is necessary. If material in the upper or lower areas of the arm were removed in order to achieve said purpose, open sections would remain. Therefore, this part would lose work effectiveness in view of tensile stresses, compressive stresses, torsional stresses and fatigue. In contrast, in the case of the invention there is never an open cross-section remain between the ends after material removal such as that described. Unlike the arm described in the United States patent, in the case of the invention no plate whatsoever is contemplated to provide support to other elements.

As described, the arm obtained by means of the method of the invention is a modular arm. This therefore allows being able to broaden the fields of designing lightweight frame components in automotive industry, such as for example:

1.—Possibility of a wide range of suspension arms due to the different final shapes of the body that can be obtained after removing surplus material from the profile.

2.—Possibility of housing elastic or ball and socket articulations. This therefore involves an even wider range for the application of the invention.

3.—capacity of adapting to different storage requirements.

4.—weight reduction of about 30%.

5.—reduction of about 10% in production costs since the number of processes involved in manufacturing the component is reduced.

6.—recycle of surplus material or of material used in the part once its life cycle ends.

The possibility that the method comprising, after any step beginning from step b), machining at least one of the terminal cross-sections of the arm located in planes perpendicular to the longitudinal axis of the arm, without reaching the corresponding end opening, is contemplated.

The method comprising, after any step beginning from step b), forming the profile, for example, to adapt the shape of the arm to the location/working space, e.g., by means of a press stroke to obtain specific deformation, is also contemplated.

The method comprising, after any step beginning from step b), bending or flexing the longitudinal axis of the arm with respect to a side wall having no inner partition extending therefrom is contemplated. Among the different options, bending or flexing the profile once it is extruded is contemplated before cutting and machining, which gives the arm its final shape.

The method comprising, after step d), assembling a connecting element in each end opening is also contemplated.

A second aspect of the invention relates to a suspension arm for multi-link suspensions of automotive vehicles which can be obtained by means of the method described above.

The arm of the invention comprises a body formed by a hollow extruded profile the cross-section of which has a closed outer contour formed by side walls and comprising at least one inner partition internally splitting the profile into at least two inner cavities, said extruded profile having the length of the arm to be obtained, according to a longitudinal axis of the arm, where a central section of the arm is machined in at least one side wall having no inner partition extending therefrom without the machining ever reaching said at least one inner partition, and where the side walls having said at least one inner partition extending therefrom comprise at least one end opening in each end area of the arm, between which the central section is arranged.

The arm comprising two terminal cross-sections located in planes perpendicular to the longitudinal axis of the arm is contemplated, where at least one of the terminal cross-sections is machined without reaching the corresponding end opening.

The arm can also comprise a forming area, for example, to adapt the shape of the arm to the location/working space, e.g., by means a press stroke to obtain specific deformation.

The possibility of the longitudinal axis of the arm being bent with respect to a side wall having no inner partition extending therefrom is contemplated.

Another possibility is to overmold a plastic material where the ball and socket joint will be housed at both ends for integrating the necessary components in a ball and socket joint.

DESCRIPTION OF THE DRAWINGS

To complement the description that is being made and for the purpose of aiding to better understand the features of the invention according to a preferred practical embodiment thereof, a set of drawings is attached as an integral part of said description in which the following is depicted with an illustrative and non-limiting character.

PREFERRED EMBODIMENT OF THE INVENTION

Figure 1:
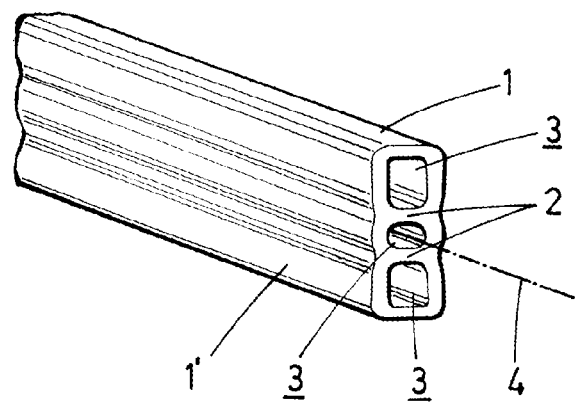
FIG. 1 shows a schematic perspective view of an extruded profile from which the arm of the invention is obtained.

In view of the mentioned drawings it can be seen how in one of the possible embodiments of the invention the method proposed by the invention comprises the following sequential steps:

a) extruding a hollow profile made of aluminium, a composite material or another material, the cross-section of which has a closed outer contour formed by side walls (1, 1') and comprising at least one, preferably two, inner partition(s) (2), internally splitting the profile into at least two inner cavities (3), b) transversely cutting the extruded profile into sections corresponding with the length of the arm to be obtained, according to a longitudinal axis (4) of the arm, c) in a central section (5) of the arm, machining at least one side wall (1) having no inner partition (2) extending therefrom without the machining ever reaching said at least one inner partition (2), and d) in the side walls (1') having said at least one inner partition (2) extending therefrom, making an end opening (6) in each end area (7) of the arm, between which the central section (5) is arranged. The end openings (6) are envisaged for housing the connecting elements (9).

Figure 2:
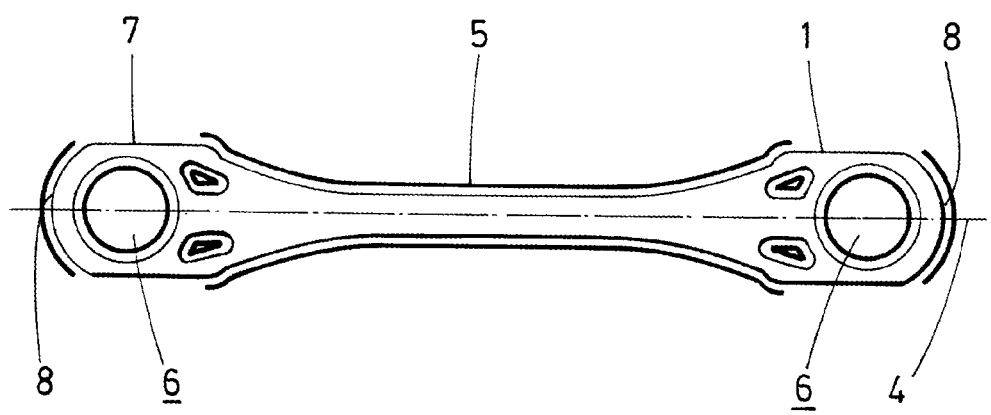
FIG. 2 shows a plan view of the body of the arm with indication of the perimetral areas from which material is removed from the profile to obtain the arm.
Figure 3:
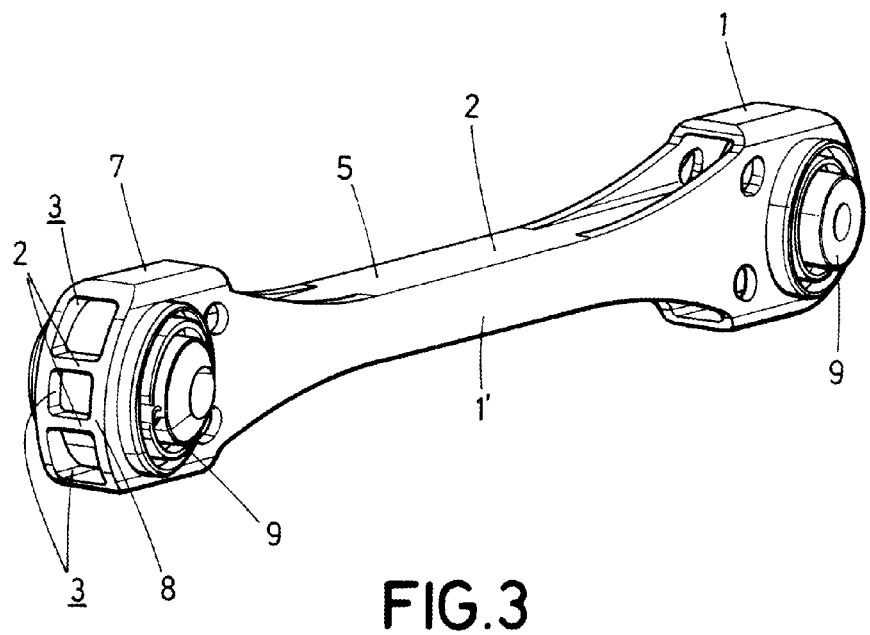
FIG. 3 shows a perspective view of a preferred embodiment of the arm of the invention.

Step c) contemplates removing surplus material to define the part either by means of brushing, broaching, milling, making a hole, drilling or forming by means of a press to obtain the arm with the final shape. As depicted in FIG. 2, material is removed from the narrower or smaller sides, except in the area of the ends where the end openings are located. The removal is progressive and reaches, at most, the visible face of the inner ribs or partitions. In the embodiment of FIGS. 2 and 3, material is removed from two side walls (1), whereas in the embodiment of FIG. 4, material is removed only from one side wall (1).

The method comprises, after any step beginning from step b), machining the terminal cross-sections (8) of the arm located in planes perpendicular to the longitudinal axis (4) of the arm either by means of brushing, broaching, milling or forming by means of a press, in a semicircular manner, without reaching the corresponding end opening (6).

The method comprises, after any step beginning from step b), forming the profile, for example, to adapt the shape of the arm to the location/working space.

Figure 4:
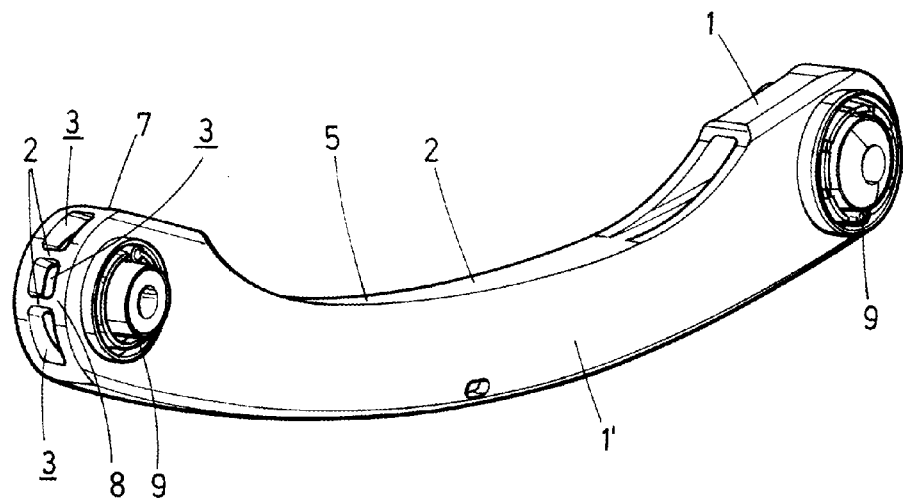
FIG. 4 shows a perspective view of an embodiment variant.

As seen in FIG. 4, the method comprises, after any step beginning from step b), bending or flexing the longitudinal axis (4) of the arm with respect to the side wall (1) having no inner partition (2) extending therefrom.

The method comprises, after step d), assembling a connecting element (9) in each end opening (6). In other words, the elastic articulations/anchorings which can be a silent block or ball and socket joints are assembled, as can be seen, the axis of the connecting elements (9), like that of the end openings (6) themselves, is parallel to the planes of the inner partitions (2).

A second aspect of the invention relates to a suspension arm for multi-link suspensions of automotive vehicles which can be obtained by means of the method described above.

The arm of the invention comprises a body formed by a hollow extruded profile the cross-section of which has a closed outer contour formed by side walls (1, 1') and comprising at least one inner partition (2) internally splitting the profile into two inner cavities (3), said extruded profile having the length of the arm to be obtained, according to a longitudinal axis (4) of the arm, where a central section (5) of the arm is machined in at least one side wall (1) having no inner partition (2) extending therefrom without the machining ever reaching said at least one inner partition (2), and where the side walls (1') having said at least one inner partition (2) extending therefrom comprise an end opening (6) in each end area (7) of the arm, between which the central section (5) is arranged.

The arm comprises two terminal cross-sections (8) located in planes perpendicular to the longitudinal axis (4) of the arm which are machined in a semicircle, without reaching the corresponding end opening (6).

The arm can also comprise a forming area, for example, to adapt the shape of the arm to the location/working space.

FIG. 4 depicts an embodiment variant in which the longitudinal axis (4) of the arm is bent with respect to side wall (1) having no inner partition (2) extending therefrom.

The suspension arm comprises a connecting element (9) assembled in each end opening (6).

As seen in the drawings, according to a preferred embodiment the suspension arm comprises two inner partitions (2) parallel to one another, where the cross-section is rectangular, the side walls (1) not having inner partitions (2) extending therefrom being smaller than the side walls (1') having inner partitions (2) extending therefrom.

In view of this description and set of drawings, the person skilled in the art will understand that the embodiments of the invention which have been described can be combined in many ways within the object of the invention. The invention has been described according to several preferred embodiments thereof, but for the person skilled in the art it will be obvious that multiple variations can be introduced in said preferred embodiments without exceeding the object of the claimed invention.

The invention claimed is:

1. A method for obtaining an arm for multi-link suspensions of automotive vehicles, comprising:
   a) extruding a hollow profile the cross-section of which has a closed outer contour formed by side walls (1, 1') and comprising at least one inner partition (2) internally splitting the profile into at least two inner cavities (3),
   b) transversely cutting the extruded profile into sections corresponding with the length of the arm to be obtained, according to a longitudinal axis (4) of the arm,
   c) in a central section (5) of the arm, machining at least one side wall (1) having no inner partition (2) extending therefrom without the machining ever reaching said at least one inner partition (2), and
   d) in the side walls (1') having said at least one inner partition (2) extending therefrom, making at least one end opening (6) in each end area (7) of the arm, between which the central section (5) is arranged.

2. The method according to claim 1, which comprises, after any step beginning from step b), machining at least one terminal cross-sections (8) of the arm located in planes perpendicular to the longitudinal axis (4) of the arm, without reaching the corresponding end opening (6).

3. The method according to claim 2, which comprises, after any step beginning from step b), bending the longitudinal axis (4) of the arm with respect to the side wall (1) having no inner partition (2) extending therefrom.

4. The method according to claim 2, which comprises, after step d), assembling a connecting element (9) in each end opening (6).

5. The method according to claim 1, which comprises, after any step beginning from step b), forming the profile.

6. The method according to claim 5, which comprises, after any step beginning from step b), bending the longitudinal axis (4) of the arm with respect to the side wall (1) having no inner partition (2) extending therefrom.

7. The method according to claim 5, which comprises, after step d), assembling a connecting element (9) in each end opening (6).

8. The method according to claim 1, which comprises, after any step beginning from step b), bending the longitudinal axis (4) of the arm with respect to the side wall (1) having no inner partition (2) extending therefrom.

9. The method according to claim 8, which comprises, after step d), assembling a connecting element (9) in each end opening(6).

10. The method according to claim 1, which comprises, after step d), assembling a connecting element (9) in each end opening (6).

11. A suspension arm for multi-link suspensions of automotive vehicles, comprising a body formed by a hollow extruded profile the cross-section of which has a closed outer contour formed by side walls (1, 1') and comprising at least one inner partition (2) internally splitting the profile into at least two inner cavities (3), said extruded profile having the length of the arm to be obtained, according to a longitudinal axis (4) of the arm, where a central section (5) of the arm is machined in at least one side wall (1) having no inner partition (2) extending therefrom without the machining ever reaching said at least one inner partition (2), and where the side walls (1') having said at least one inner partition (2) extending therefrom comprise an end opening (6) in each end area (7) of the arm, between which the central section (5) is arranged.

12. The suspension arm according to claim 11, comprising two terminal cross-sections (8) located in planes perpendicular to the longitudinal axis (4) of the arm, where at least one of the terminal cross-sections (8) is machined without reaching the corresponding end opening (6).

13. The suspension-arm according to claim 12, comprising two inner partitions (2) parallel to one another, where the cross-section of each inner partition is rectangular, the side walls (1) not having inner partitions (2) extending therefrom being smaller than the side walls (1') having inner partitions (2) extending therefrom.

14. The suspension arm according to claim 11, comprising a forming area.

15. The suspension-arm according to claim 14, comprising two inner partitions (2) parallel to one another, where the cross-section of each inner partition is rectangular, the side walls (1) not having inner partitions (2) extending therefrom being smaller than the side walls (1') having inner partitions (2) extending therefrom.

16. The suspension arm according to claim 11, wherein the longitudinal axis (4) of the arm is bent with respect to the side wall (1) having no inner partition (2) extending therefrom.

17. The suspension-arm according to claim 16, comprising two inner partitions (2) parallel to one another, where the cross-section of each inner partition is rectangular, the side walls (1) not having inner partitions (2) extending therefrom being smaller than the side walls (1') having inner partitions (2) extending therefrom.

18. The suspension arm according claim 11, comprising a connecting element (9) assembled in each end openina (6).

19. The suspension-arm according to claim 18, comprising two inner partitions (2) parallel to one another, where the cross-section of each inner partition is rectangular, the side walls (1) not having inner partitions (2) extending therefrom being smaller than the side walls (1') having inner partitions (2) extending therefrom.

20. The suspension arm according to claim 11, comprising two inner partitions (2) parallel to one another, where the cross-section of each inner partition is rectangular, the side walls (1) not having inner partitions (2) extending therefrom being smaller than the side walls (1') having inner partitions (2) extending therefrom.

\* \* \* \* \*